United States Patent
Siekman et al.

(10) Patent No.: US 11,874,823 B1
(45) Date of Patent: Jan. 16, 2024

(54) AGNOSTIC IMAGE DIGITIZER TO DETECT FRAUD

(71) Applicant: Bank of America Corporation, Charlotte, NC (US)

(72) Inventors: James Siekman, Charlotte, NC (US); Aubrey Breon Farrar, Sr., Waldorf, MD (US); Mohamed Faris Khaleeli, Charlotte, NC (US); Patricia Ann Albritton, Charlotte, NC (US); Sheila Page, Charlotte, NC (US); Mark Alan Odiorne, Waxhaw, NC (US); Marcus R. Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/874,714

(22) Filed: Jul. 27, 2022

(51) Int. Cl.
*G06F 16/00* (2019.01)
*G06F 16/23* (2019.01)
*G06F 21/62* (2013.01)

(52) U.S. Cl.
CPC ...... *G06F 16/2365* (2019.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 7,860,870 B2* | 12/2010 | Sadagopan | ......... | G06F 16/9535 707/758 |
| 10,810,663 B1* | 10/2020 | Flowers | ................. | G06N 3/006 |
| 11,461,840 B1* | 10/2022 | Flowers | ........... | G06Q 10/06316 |
| 11,574,318 B2* | 2/2023 | Cuan | ........................ | G06F 7/08 |
| 2008/0059474 A1* | 3/2008 | Lim | ...................... | G06F 16/176 707/E17.106 |
| 2008/0065700 A1* | 3/2008 | Lim | ..................... | G06F 21/6218 |
| 2008/0071728 A1* | 3/2008 | Lim | ........................ | H04L 63/20 |
| 2008/0091682 A1* | 4/2008 | Lim | ...................... | H04L 51/234 707/999.009 |
| 2008/0301090 A1* | 12/2008 | Sadagopan | ......... | G06F 16/9535 |
| 2011/0251951 A1* | 10/2011 | Kolkowitz | ............. | G06Q 20/10 705/39 |
| 2012/0030202 A1* | 2/2012 | B'Far | .................... | G06F 16/211 707/E17.046 |
| 2020/0293675 A1* | 9/2020 | Antonatos | ........... | G06F 21/6218 |

(Continued)

*Primary Examiner* — Farhan M Syed
(74) *Attorney, Agent, or Firm* — Weiss & Arons LLP

(57) ABSTRACT

Methods for enhancing compatibility of a document of an entity with an organization's database on a computer server to facilitate detection of a fraudulent submission. Methods may include receiving a populated document in a first format from the entity, using a processor to digitize the document into a digital format, such as bytes, and further into a second format, where the first format may not be compatible with the database and the second format may be compatible with the database. Methods may include using the processor, optionally running a statistical model, to determine an entity identifier, a predicted value of a data field in the document, and whether there is a difference between the value in the predicted data field and a corresponding value in the populated document. Methods may include implementing a corrective action, such as raising a fraud alert at the organization, when there is a difference.

3 Claims, 11 Drawing Sheets

(56) References Cited

U.S. PATENT DOCUMENTS

| | | | |
|---|---|---|---|
| 2022/0051263 A1* | 2/2022 | Cuan | G06Q 20/4016 |
| 2022/0198562 A1* | 6/2022 | Cella | G06Q 40/04 |
| 2022/0261537 A1* | 8/2022 | Mudgil | G06V 30/412 |
| 2022/0366494 A1* | 11/2022 | Cella | H04L 9/50 |
| 2022/0414761 A1* | 12/2022 | Flowers | G06Q 30/0631 |

* cited by examiner

AGNOSTIC IMAGE DIGITIZER TO DETECT FRAUD

FIELD OF TECHNOLOGY

Aspects of the disclosure relate to extending the usable lifetime of a database to assist in fraud detection. Aspects of the disclosure relate to digitizing an image to make it compatible with a database.

BACKGROUND OF THE DISCLOSURE

Organizations rely on computer programs to perform their daily operations. Many times, these systems are not able to cope with the adoption of modern technologies. Technology is constantly advancing and new ways for entities to provide input to organizations are changing. The formats of these inputs are also constantly changing over time.

Organizations invest significant resources of money, time, and training to bring on new systems for managing their daily operations. Without these systems performing as intended, organizations would find it difficult to operate, and would eventually cease to exist as a viable entity. Organizations often have systems that were created ten, twenty, or even thirty years ago. While old, they still perform critical functions for the organization that allow the organization to continue to function.

Frequently, an organization is reluctant to replace an existing system that is critical to the organization's operations. Two of the primary considerations are as follows. First, the cost to replace the system may be materially greater than the cost to continue to operate it, even with various patches implemented to keep it going. Second, the requirement of concerned stakeholders such as auditors and regulators to certify that a new system operates with sufficient confidence. This duality may result in a significant investment to overhaul a legacy system only to have the new system fail to achieve the auditor's and regulator's requirements, leading to a significant loss of money and time without the necessary permission to implement the new system.

An organization may experience fraudulent attempts to gain access to its products and services. An example of a fraudulent attempt may be an imposter who presents information and credentials as though they are making a legitimate inquiry as another party.

There is a need to extend the usable lifetime of an organization's database such as a legacy database.

There is a further need to enhance an entity's user experience by making documents the entity submits usable by an organization's legacy database without requiring an altered submission by the entity.

There is an additional need to extract data in a legacy database to provide a dataset for training a statistical model.

There is a need to use a statistical model to aid an entity providing an organization with submissions.

The is a further need to facilitate continual improvement of a statistical model.

There is a need to identify fraudulent attempts to gain access to the goods and services of an organization.

SUMMARY OF THE DISCLOSURE

It is an object of the invention to extend the usable lifetime of an organization's database, such as a legacy database. Digitizing documents currently stored in an organization's database in a non-digital format, such as a picture, scan, or facsimile, may contribute to achieving this objective. Adding the data to a more state-of-the-art database may facilitate the organization's ability to implement tools, such as statistical models, to enhance an entity's user experience. The statistical model may be an artificial intelligence (AI) tool, such as a machine learning AI system or a deep learning AI system, which facilitates learning from a legacy database to enhance an entity's user experience.

It is a further object of the invention to enhance an entity's user experience by making documents of one format compatible with databases of other formats. In this aspect, the database may be a more current database including a state-of-the-art database. This object may allow for an entity to submit documents in a format that is not currently compatible with an organization's database. Digitizing submitted documents may facilitate adding data from submitted documents into the state-of-the-art database. Submissions may include pictures, scans, facsimile, and the like.

It is an additional objective of the invention to facilitate the extraction of data and metadata in a legacy database to provide a dataset for training a statistical model. Accessing data and metadata from a legacy database may include digitizing entries in the database, which may facilitate analysis of the data and metadata with less manual intervention.

It is an objective of the invention to use a statistical model to aid an entity in providing an organization with submissions, such as aiding in completing a document. This may include pre-populating fields in a document that the entity seeks to complete. This may include predicting a type of document sought by an entity based on preliminary information provided by the entity.

It is a further object of the invention to provide continual improvement to a statistical model. Using past and future data and metadata from documents submitted by an entity may allow an organization to develop and continually update a statistical model. This may include obtaining additional input from an entity to help improve the accuracy of the statistical model.

It is an objective of the invention to identify fraud, such as fraudulent attempts to gain access to the goods and services of an organization, preferably before the organization provides the goods and services.

Provided are systems and methods to meet the above outlined objects of the invention.

Methods may include enhancing compatibility of a document with a database, for example, a document submitted by an entity to an organization. Methods may include facilitating detection of a fraudulent submission. Methods may include storing a database on a computer server, for example, a database of an organization and a computer server of the organization. Methods may include receiving a document in a first format from the entity, where the entity populated the document with data. Methods may include using a processor to digitize the document from the first format into a digital format, where the first format may not be compatible with the database. The processor may be run on computer hardware, such as the organization's computer hardware. The processor may be referred to as a computer hardware processor.

An entity may be an individual such as a person or a group of people. An entity may be an establishment such as a corporation. The corporation may be a for-profit corporation or a non-profit corporation. An entity may be a government organization, school, college, university, hospital, or the like.

An organization may be a corporation. The corporation may be a for-profit corporation or a non-profit corporation. The entity and the organization are distinct and separate from one another.

In one aspect, the digital format of the document is in bytes.

Methods may further include using the processor to convert the document from a digital format into a second format, where the second format of the document may be compatible with the database. Methods may include using the processor to populate the database on the computer server with data from the document in the second format. Methods may further include using the processor to update a statistical model based on data from the document.

Methods may include receiving another document populated with data by an entity. For reference, this document shall be referred to as the second document, and the previously described document as the first document. Methods may include receiving the second document from the same entity as the first document. Methods may include receiving the second document from a source other than the entity which provides the first document.

Methods may include using the processor to determine an entity identifier based on data associated with the second document. Methods may further include using the processor to run the statistical model based on data stored in the database and the entity identifier to determine a predicted value for a data field in the second document. Methods may include using the processor to determine if there is a difference between the predicted value of the data field and the correlating value for the data field provided by the entity in the populated second document.

Methods may further include when there is a difference between the two values, implementing a corrective action. Methods may include raising a fraud alert at the organization as the corrective action. Methods may include contacting the entity as the corrective action. Methods may include verifying the accuracy of the populated second document with the entity. Methods may further include using the entity identifier to identify information for contacting the entity from information found in the database. In one aspect, the contact information is in the database before receiving the populated second document.

Methods may include receiving the second document in a format that is compatible with the organization's database. Methods may include receiving the second document in a format that is not compatible with the organization's database. When the second document is in a format that is not compatible with the database, methods may include using a processor to digitize the second document into a digital format. In one aspect, the digital format of the second document is in bytes. Methods may further include using the processor to convert the second document from a digital format into a second format, where the second format of the second document may be compatible with the organization's database.

Methods may further include using optical character recognition (OCR) to digitize a populated document into a digital format, especially for use when the document is in a format that is not compatible with the organization's database.

When determining the entity identifier, methods may include where the identifier is a type of form of the populated second document. The type of form might be an "intake form" for the entity to obtain a product or service. The type of form might be a "return form" for an entity to seek a refund or exchange for a previously obtained product or service. The type of form might be a "change form" for the entity to change one's address, other personal information, or information relating to an account with the organization. The entity identifier may be the entity's name. When the entity is an individual, the entity identifier may be the individual's name such as their first name and last name. When the entity is an establishment, the entity name may be the name of the establishment. The entity identifier may be metadata associated with the second document.

Methods may include, when resolving the corrective action, updating the statistical model based on data in a correct version of the second document. The method may include updating the statistical model based on metadata in a correct version of the second document. The method may include updating the statistical model based on data and metadata in the correct version of the second document.

The correct version of the second document may be the populated version received from the entity. The correct version of the second document may be a corrected version received from the entity. The corrected version may reflect a value of a data field predicted by the processor running the statistical model.

Methods may include populating the database with data from previous documents. Methods may further include populating the database with metadata from previous documents. Methods may include populating the database with data and metadata from previous documents.

Methods may include using a machine learning artificial intelligence method as the statistical model. Methods may include using a deep learning artificial intelligence method as the statistical model. In one example, the deep learning artificial intelligence method uses neural networks.

A system may include a processor and a non-transitory computer-readable storage medium, the latter storing processor-executable instructions. This system, when executed by the processor, may cause the processor to perform the above-described methods.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which.

DETAILED DESCRIPTION OF THE DISCLOSURE

Figure 1:
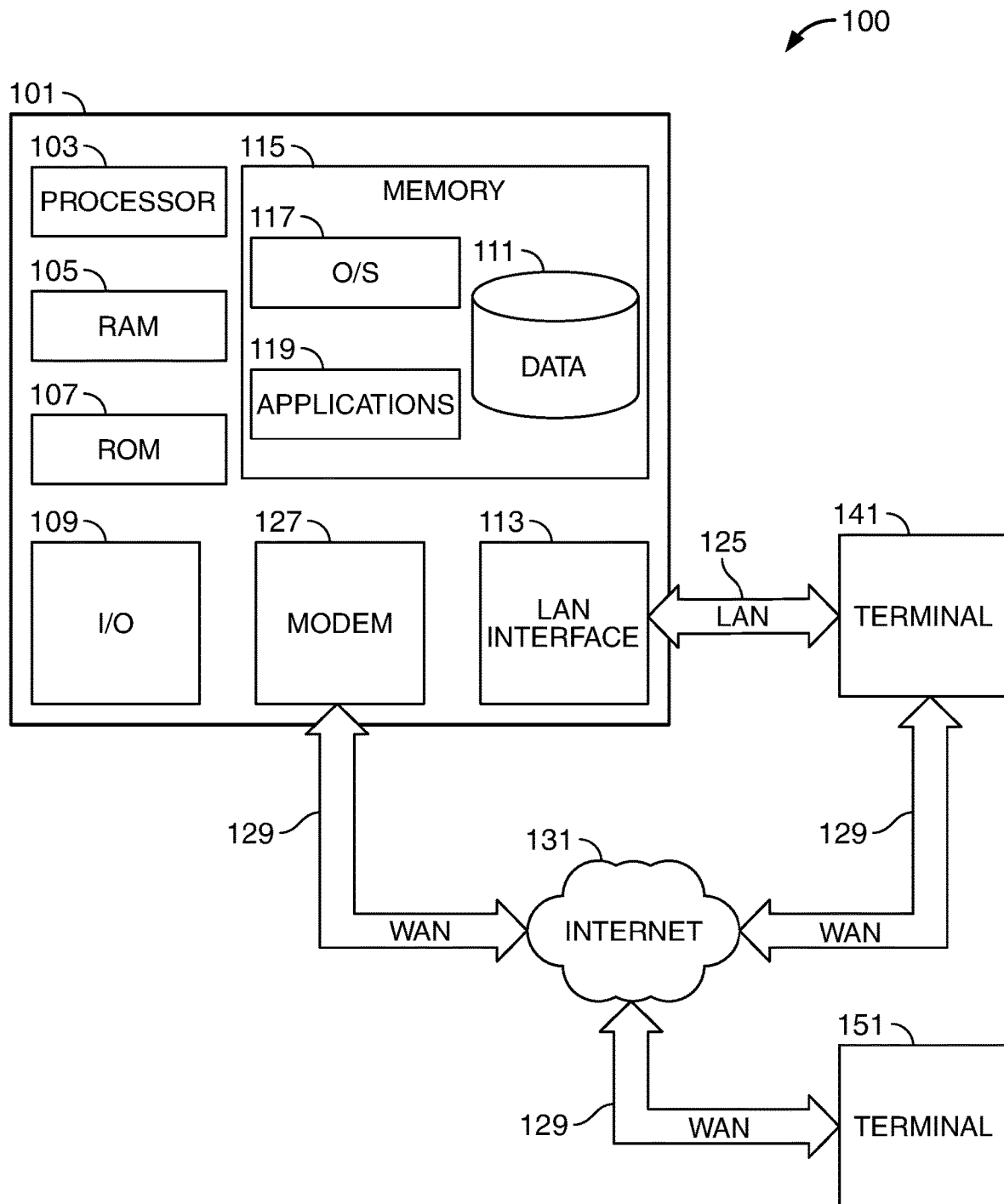
FIG. 1 is a block diagram of apparatus in accordance with principles of the disclosure.

Organizations maintain databases containing vital information to the organization's operations. Submissions from various entities may build these databases. These submissions may be in the form of documents. Documents may contain data and metadata. Entities may submit the documents to the organization by a variety of ways including ways that allow for extraction of the data and metadata from the documents to populate the databases. However, some entity submissions may not be compatible with the database.

In instances where a document submission to an organization by an entity is not compatible with the organization's database, the incompatibility may be manifest such that a processor is not able to extract data and metadata from the document or is not able to use extracted data and metadata to populate a database. The described incompatibility may be due to the format of the submitted document. For example, the document format might be that of a scanned image or a picture. The processor, for example, may need for the data to be in a textual form for data and metadata to be extractable for updating the database.

In one aspect of the current disclosure, described are systems and methods for digitizing a first format, such as a scan or a picture, into a digital format. A processor may further convert the document into another format thereby facilitating extractions of the document's data and metadata.

Another aspect of the current disclosure may include, for example, a collection of documents submitted to an organization over time. The organization may have a current system that accumulates submitted documents and archives them without extracting data and metadata. The organization may desire to implement a more advanced system where a processor extracts data and metadata from the documents and uses the data and metadata to populate a database. The submitted documents may be in a format that the processor does not recognize or cannot extra data and metadata to populate the database. In such instances, the current disclosure describes systems and methods for digitizing a first format, such as a scan or a picture, into a digital format. The processor may extract data and metadata from the digital format of the document or from a further reformat of the document.

A further aspect of the current disclosure includes utilizing a populated database, such as the one described herein, to train and implement a statistical model. The statistical model may, for example, utilize an artificial intelligence (AI) tool, such as a machine learning AI system or a deep learning AI system. The statistical model may be located on a computer server, for example, the computer server of an organization. The statistical model may make various predictions based on historical data and metadata, for example, from documents submitted by various entities.

For example, the processor running a statistical model may upload data and metadata from a document received from an entity. The processor running a statistical model may determine a document type. In an iterative way, classifying documents into distinct types may facilitate further training and utilizing the statistical model. For example, instead of just utilizing data from a specific entity or from every entity in developing a statistical model, classification allows the use of subsets of documents. The data and metadata from these documents may provide for an enhanced accuracy of the statistical model as the set of data used to train the model may be greater.

As another example, when receiving a request from an entity to complete a document, the processor running a statistical model may pre-populate all or portions of the fields in the requested document. The processor running a statistical model may provide a document to the requesting entity to verify pre-populated fields and to complete the fields that were not pre-populated.

The processor may ascertain the confidence level of the statistical model. For example, the processor may ascertain a pre-population confidence level. It may ascertain a post-population confidence level. A pre-population confidence level refers to a measure in the confidence of the statistical model before a field of a current document is pre-populated by using the statistical model. The processor may ascertain a pre-population confidence level, for example, by testing statistical model predictions against existing documents stored on a computer server used to generate the model. Achieving the pre-population confidence level may occur when predictions by the statistical model match documents stored on the computer. Such an assessment may lead to utilizing the statistical model to pre-populate a document when an entity makes a request for the document from the organization. Failing the pre-population confidence level may occur when predictions by the statistical model do not match documents stored on the computer. For example, a document submission by an entity may be subsequently received and used to update the database and statistical model. The additional data and metadata from the document may facilitate further training the model to bring it into compliance with a confidence level requirement. In another aspect, adjusting the statistical model may improve it and thereby achieve the pre-population confidence level.

A post-population confidence level refers to a measure in the confidence of the statistical model after the processor utilizing the statistical model pre-populates a field of a current document. The processor measures the accuracy of the pre-population of a document to a document completed by an entity. A confidence level represents less differences between the pre-population and completed document by the entity. Less differences lead to a higher confidence level. In reaction to differences, the processor reaches out to the entity to confirm that the change was intentional.

When the statistical model makes the error, the processor may keep count of the unsuccessful pre-populated field entry attempts. When the count exceeds a threshold, a post-population confidence level may fall out of compliance indicating a low confidence level in the statistical model. Dealt with further in the description are instances where an entity made the error.

If the post-population confidence level falls out of compliance, the processor may implement one of the following options. For example, the processor may add data and metadata from the received completed document to further train the model. The processor may use additional completed documents to extract data and metadata for the purposes of updating the statistical model. The additional data and metadata from the document may facilitate further training the model to bring it into compliance with a confidence level requirement. In another aspect, the processor or a programmer may adjust the statistical model may improve to make it achieve the pre-population confidence level.

An additional aspect of this disclosure includes error detection for submissions from an entity. When an entity requests a document, a processor may utilize a statistical model to provide a pre-populated field in the document provided to the entity. The entity may then check for the accuracy of the pre-populated fields and may add information to any of the other fields which were not pre-populated. The processor may compare the document sent to the entity to the document received. When there is a discrepancy in the pre-populated fields, as described previously, the processor may communicate the changed field or fields to the entity to confirm that the change was intentional. This action may give the entity an extrinsic way to check its work for potential errors.

When referring to data in this description, the reference may be to data from a document. The reference may be to metadata from a document. The reference may be to data and metadata from a document.

When referring to data and metadata in this description, the reference may be to both data and metadata from a document. The reference may be to either metadata or data from a document.

A further aspect of this disclosure includes using a statistical model to assist an organization in fraud detection. For example, when a submission of a document from an entity is received by an organization and the document is not compatible with the organization's database, the incompatibility may be manifest such that a processor is not able to extract data and metadata from the document or is not able to use extracted data and metadata to populate a database. The processor may digitize the document into a digital format. The processor may add data and metadata from the digitized document to a database on a computer server. In another aspect, the processor may convert the document from a digital format to another format, and then add the data and metadata to the database on the computer server.

Another aspect of this disclosure includes using a processor to build a statistical model from documents stored at a computer server. The statistical model references data, metadata, or data and metadata extracted from the documents and stored on a database at the computer server. In one aspect, the format of the documents is not compatible with the format of the database. The processor may digitize the document into a digital format. The processor may add data and metadata from the digitized document to a database on a computer server. In another aspect, the processor may convert the document from a digital format to another format, and then add the data and metadata to the database on the computer server.

By referencing the populated database, when an entity submits a document, a statistical model on a computer server may compare the submitted document with similar prior submissions. The processor may build the statistical model utilizing the data and metadata in a database found on a computer server. The processor may identify specific entity identifier information that facilitates locations of relevant data and metadata of potential relevance to the entity. The processor may use the entity identifier information to use a statistical model to determine expected inputs by the entity in the submitted document. When there is a difference between data and metadata in the submitted document from an entity and what the statistical model predicted the entity would enter, the processor may submit the document for further analysis. For example, the processor implements human review of the document. The processor may implement a specialized algorithm for assessing potential threats of fraud. Furthermore, the processor may enter the results of the human review or the specialized algorithm review into the database as data to assist in training and updating the statistical model to manage future document submissions by this entity and other entities.

Another aspect of fraud detection may be looking for anomalous patterns in an entity's behavior. The processor may utilize a statistical model to identify unusual behavior by an entity. Examples of anomalous behavior may include overly frequent submissions, submissions of a similar nature in a shorter than expected timeframe, changes in personal information such as identification numbers, name, phone numbers and email addresses. When crossing a threshold of concern, the processor flags the matter for further review, such as review by a human.

A further aspect of fraud detection may include designating an entity as a trusted entity upon presentation of proper credentials. When designating an entity as a trusted entity, the processor may look for potential errors instead of fraudulent submissions. The processor may provide the potential errors to the entity for confirmation.

The processor may relax fraud detection when the submission comes from a trusted device. For example, an entity might give its credentials to use the device. Therefore, the processor may view submissions from that device as safe. Instead, the processor will view anomalies as potential errors. The processor may provide the entity with the potential error for confirmation.

A further aspect of the disclosure includes automating a process for submitting compliance forms to a regulatory body. There may be instances where the organization needs to submit a received document in whole or in part to a regulatory body. When documents are not compatible or are poorly compatible with a computer server, obtaining data and metadata from the document for use in the submission of compliance forms may be difficult. In one aspect, the disclosure may include a processor for digitizing the document into a digital format. In a further aspect, the processor may extract data and metadata from the digital format for populating a compliance form. In a further aspect, the processor may use the digital format to populate a database. The processor may use the database as a source of information for populating a compliance form. In a further aspect, the processor may convert the document from a digital format into another format. The processor may then populate the database with data and metadata from this document format. The processor may utilize the updated database as a source of information for populating a compliance form.

The processor may utilize a statistical model on a computer server to assist in populating and submitting a compliance form. The processor may identify specific entity identifier information that facilitates locations of relevant data and metadata of potential relevance to the entity. The processor may use the entity identifier information to use a statistical model to determine expected inputs by the entity in the submitted document. When there is a difference between data and metadata in the submitted document from an entity and what the statistical model predicted the entity would enter, the processor may submit the document back to the entity for confirmation of the entity's submission. Once clarified, the processor may prepare a compliance form for submission to a regulatory body.

An entity may be an individual such as a person or a group of people. An entity may be an establishment such as a corporation. The corporation may be a for-profit corporation or a non-profit corporation. An entity may be a government organization, school, college, university, hospital, or the like.

An organization may be a corporation. The corporation may be a for-profit corporation or a non-profit corporation. The entity and the organization are distinct and separate from one another.

The processor may use the statistical model to determine an appropriate compliance form based on the data and metadata found in a submitted document from an entity. The statistical model based on data and metadata found in a database on a computer server may auto-populate some or all the fields on a compliance form based on submitted documents.

The statistical model on computer servers described in this specification may operate as a form of artificial intelligence (AI). One type of AI is a machine learning AI system. Another type of AI is a deep learning AI system.

One may program a machine learning AI system to identify patterns in data sets and make decisions based on the patterns. One typically uses machine learning algorithms to predict future behavior based on historical patterns. By providing new and updated data, machine learning AI systems may improve their predictions. However, even though machine learning AI systems may improve their predictions, such systems only detect patterns based on how they are pre-programmed to review provided data. Machine learning systems do not adapt on their own to look at data in unusual ways or flag patterns in the data they were not pre-programmed to search for.

On the other hand, deep learning AI systems adapt when exposed to different patterns of data. Deep learning AI systems may uncover features or patterns in data that they were never specifically programmed to find or search for. Deep learning AI systems are typically based on neural networks. A neural network takes an input and passes the input through a network of neurons—called layers—and provides an output. The more layers of neurons which are part of the network, the "deeper" the network. A neural network learns from outputs flagged as erroneous and "adapts" its neuron connections such that the next time it receives a particular input it generates a relevant output.

Neural networks must undergo training by analyzing data sets. Neural networks learn from the training data sets provided to them and rearrange interconnections between the neurons in response to training data. The strength or weight of connections between the neurons or layers can vary. A connection between two or more layers can be strong, weak, or anywhere in between. When a neural network self-adapts it adjusts the strength of the connections among its neurons to generate more accurate outputs.

To get a neural network to provide accurate outputs, neuron connections are adjusted by repeatedly training the network by exposing it to training data sets. There can be thousands and millions of neurons or layers in a network and adjusting their connections between the layers is a compute-intensive matrix-based mathematical procedure.

Typically, training of deep learning AI systems is performed using Graphics Processing Unit ("GPU") clusters of servers. A GPU is hardware capable of performing math computations over a huge amount of data at the same time. GPU's do not operate as fast as central processing units ("CPUs"). However, GPUs are capable of processing larger quantities of data per unit of time. Thus, even though each individual GPU operation may execute more slowly, applying computational operations to more data in parallel exceeds CPU performance, allowing AI system to be fully trained faster.

The training phase may go on for multiple iterations until the outputs of the AI system are satisfactory and accurate. Once that happens, the trained neural network is released to production on less powerful hardware. Data processed after the AI system is in production may be fed back into the neural network to correct it or enhance output according to the latest trends detected in newly acquired data sets. Therefore, the process of training and retraining a neural network can occur iteratively over time. Retraining a neural network is important for maintaining its accuracy with respect to new data sets.

In one aspect, a processor may implement a statistical model in various systems and methods throughout this specification, and that statistical model may be a machine learning AI system.

In another aspect, a processor may implement a statistical model in various systems and methods throughout this specification, and that statistical model may be a deep learning AI system. In one aspect, the deep learning AI system may be a neural network. In a further aspect, the neural network may be a deep neural network.

In further aspect, the processor may implement more than one statistical model in various systems and methods taught throughout this specification, and the more than one statistical model may be machine learning AI systems. In another aspect, the more than one statistical model may be deep learning AI systems. These deep learning AI systems may be neural networks. In another aspect, the more than one statistical model may be a combination of machine learning AI systems and deep learning AI systems.

Provided are systems and methods to meet the above outlined objects of the invention.

Methods for enhancing compatibility of a document of an entity with an organization's database on a computer server to facilitate detection of a fraudulent submission. Methods may include receiving the document already populated in a first format from the entity. Methods may include using a processor to digitize the document into a digital format, such as bytes.

Methods may include using the processor to convert the document from a digital format into a second format, where the first format may not be compatible with the database and the second format may be compatible with the database. Methods may include using the processor to determine an entity identifier.

Methods may include using the processor to run a statistical model based on data stored in the database and reference the entity identifier to predict a value of a data field in the document. Methods may include using the processor to determine whether there is a difference between the value in the predicted data field and a value in a corresponding data field in the populated document.

Methods may include implementing a corrective action when there is a difference. Methods may include raising a fraud alert directed to the organization as the corrective action. Methods may include contacting the entity as a corrective action to verify the accuracy of the document as received from the entity.

Methods may further include using optical character recognition (OCR) to digitize the populated document in the first format to a digital format.

When determining an entity identifier, methods may include where the identifier is a type of form of the populated document. The type of form might be an intake form for obtaining a product or service. The entity identifier may be the entity's name. When the entity is an individual, it may be the individual's name such as their first name and last name. When the entity is an establishment, the entity name may be the name of the establishment. The entity identifier may be metadata associated with the document.

Methods may further include using the entity identifier to identify information for contacting the entity from information found in the database. For example, the information found in the database may be preexisting information found in the database before receipt of the entity's populated second document or information found in the database may be known independently of the entity's populated second document.

Methods may further include using the entity identifier to identify information for contacting the entity from preexisting information found in the database before receipt or independent of receipt of the entity's populated document.

Methods further include, when resolving the corrective action, updating the statistical model based on data in a correct version of the document. The correct version of the document may be the populated version received from the entity. The correct version of the document may be a corrected version received from the entity. The corrected version may reflect a value of a data field predicted by the processor running the statistical model. The method may further include updating the statistical model based on metadata in the correct version of the document. The method may further include updating the statistical model based on data and metadata in the correct version of the document.

Methods may include populating the database with data from previous documents. Methods may further include populating the database with metadata from previous documents. Methods may include populating the database with data and metadata from previous documents.

Methods may include using a machine learning artificial intelligence system as the statistical model. Methods may include using a deep learning artificial intelligence system as the statistical model. In one example, the deep learning artificial intelligence system uses neural networks.

A system may include a processor and a non-transitory computer-readable storage medium, the latter storing processor-executable instructions. This system, when executed by the processor, may cause the processor to perform the above-described methods.

In a different aspect of the disclosure, systems for enhancing compatibility of a document with a database of an organization to facilitate use of a statistical model, where the computer server stores the database and the contents of the database enable the statistical model to detect a fraudulent submission. Systems may include the processor and the non-transitory computer-readable storage medium storing processor-executable instructions that, when executed by the processor, may cause the processor to perform the following steps.

Systems may cause the processor to digitize a document in a first format into a digital format, such as bytes, where the first format may not be compatible with the database or may be poorly compatible with the database. Systems may further cause the processor to convert the document from a digital format into a second format, where the second format of the document may be compatible with the organization's database.

Systems may cause the processor to populate the database on the computer server with data from the document in the second format. Systems may cause the processor to populate the database on the computer server with metadata from the document in the second format. Systems may cause the processor to populate the database on the computer server with data and metadata from the document in the second format. Systems may further cause the processor to update the statistical model based on data from the document.

Systems may receive another document populated with data from the entity. For reference, this document shall be referred to as the second document, and the previously described document as the first document. Systems may include receipt of the second document from the same entity as the first document. Systems may include receipt of the second document from a source other than the entity which provides the first document.

Systems may determine an entity identifier using a processor which utilizes data associated with the second document. Systems may determine a predicted value of a data field in the second document using a processor to run a statistical model based on data stored in the database and the entity identifier. Systems may determine, using the processor, if there is a difference between the predicted value of the data field and a correlating value for a data field in the second document populated by the entity.

Systems may implement a corrective action when there is a difference between the predicted and calculated values. Systems may raise a fraud alert at the organization as the corrective action. Systems may contact the entity as a corrective action to verify the accuracy of the second document as received from the entity. Systems may use the entity identifiers to identify information for contacting the entity from preexisting information found in the database before receipt or independent of receipt of the entity's populated second document.

Systems may further include the use of optical character recognition (OCR) to digitize the populated document in the first format to a digital format.

An example of an entity identifier is a type of form of the populated second document. The type of form might be an intake form for obtaining a product or service. Another example of the entity identifiers is entity's name. When the entity is an individual, it may be the individual's name such as their first name and last name. When the entity is an establishment, the entity name may be the name of the establishment. The entity identifier may be metadata associated with the second document.

When resolving the corrective action, systems update the statistical model based on data in a correct version of the second document. The correct version of the second document may be the populated version received from the entity. The correct version of the second document may be a corrected version received from the entity. The corrected version may reflect values of data fields predicted by processor running the statistical model. The system may update the statistical model based on metadata in the correct version of the second document. The system may update the statistical model based on data and metadata in the correct version of the second document.

Systems may populate the database with data from previous documents. Systems may populate the database with metadata from previous documents. Systems may populate the database with data and metadata from previous documents.

Systems may use a machine learning artificial intelligence system as the statistical model. Systems may use a deep learning artificial intelligence system as the statistical model. In one example, the deep learning artificial intelligence system uses neural networks.

Described are illustrative embodiments of apparatus and methods in accordance with the principles of the invention with reference to the accompanying illustrative drawings, which form a part hereof. Utilizing other embodiments, and structural, functional, and procedural modifications may stay within the scope and spirit of the present invention.

The drawings show illustrative features of apparatus and methods in accordance with the principles of the invention. The drawings show illustrative features in the context of selected embodiments. One may practice, in accordance with the principles of the invention, one of the embodiments along with features shown in connection with another of the embodiments.

Apparatus and methods described herein are illustrative. Apparatus and methods of the invention may involve some or all the features of the illustrative apparatus and/or some or all the steps of the illustrative methods. One may perform the steps of the methods in an order other than the order shown or described herein. Some embodiments may omit steps shown or described in connection with the illustrative methods. Some embodiments may include steps that are not shown or described in connection with the illustrative methods but shown or described in a different portion of the specification.

One of ordinary skill in the art will appreciate that one may perform the steps shown and described herein in other than the recited order and that one or more steps illustrated may be optional. The methods of the above-referenced embodiments may involve the use of any suitable elements, steps, computer-executable instructions, or computer-readable data structures. In this regard, disclosed are other embodiments as well that can be partially or wholly implemented on a computer-readable medium, for example, by storing computer-executable instructions or modules or by utilizing computer-readable data structures.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein. (Each of the apparatus illustrated in FIGS. 3-5 and 9-11 and/or described herewith, including Hash Table 302, Edge Computing Device 304, hashing algorithm processor 404 and centralized data repository 930, may include some or all the elements and apparatus of system 100.)

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or API. One may understand that web-based, for the purposes of this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program (s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for the purposes of this application, as engines with respect to the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
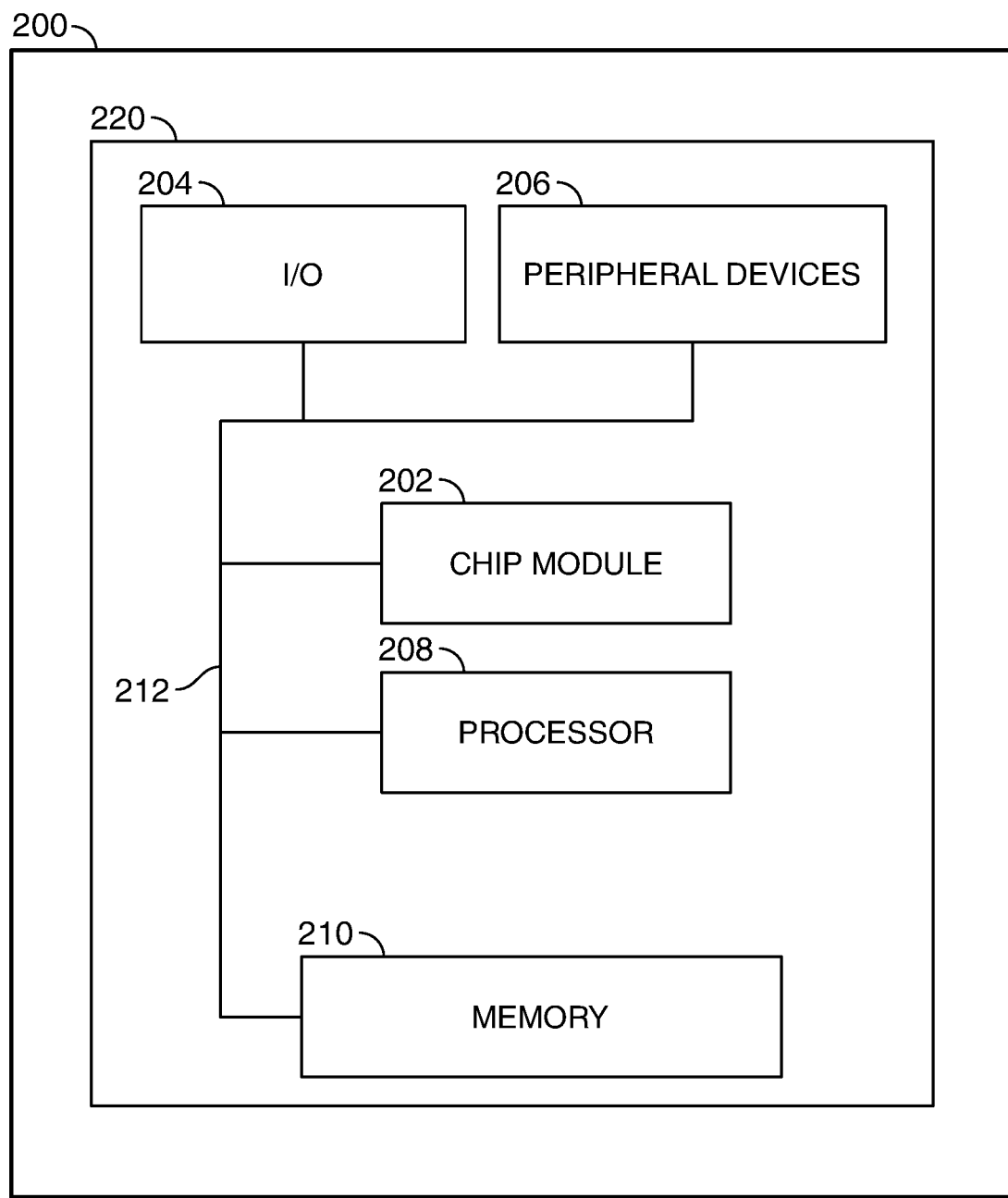
FIG. 2 is another block diagram of apparatus in accordance with principles of the disclosure.

FIG. 2 shows an illustrative block diagram of apparatus 200. One may configure apparatus 200 in accordance with the principles of the disclosure. Apparatus 200 may be a computing device. (Apparatus 200 may include one or more features of the apparatus shown in FIGS. 3-5 and 9-11 and/or described herewith, including Hash Table 302, Edge Computing Device 304, hashing algorithm processor 404 and centralized data repository 930, and may include some or all the elements and apparatus of system 100 shown in FIG. 1.) Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
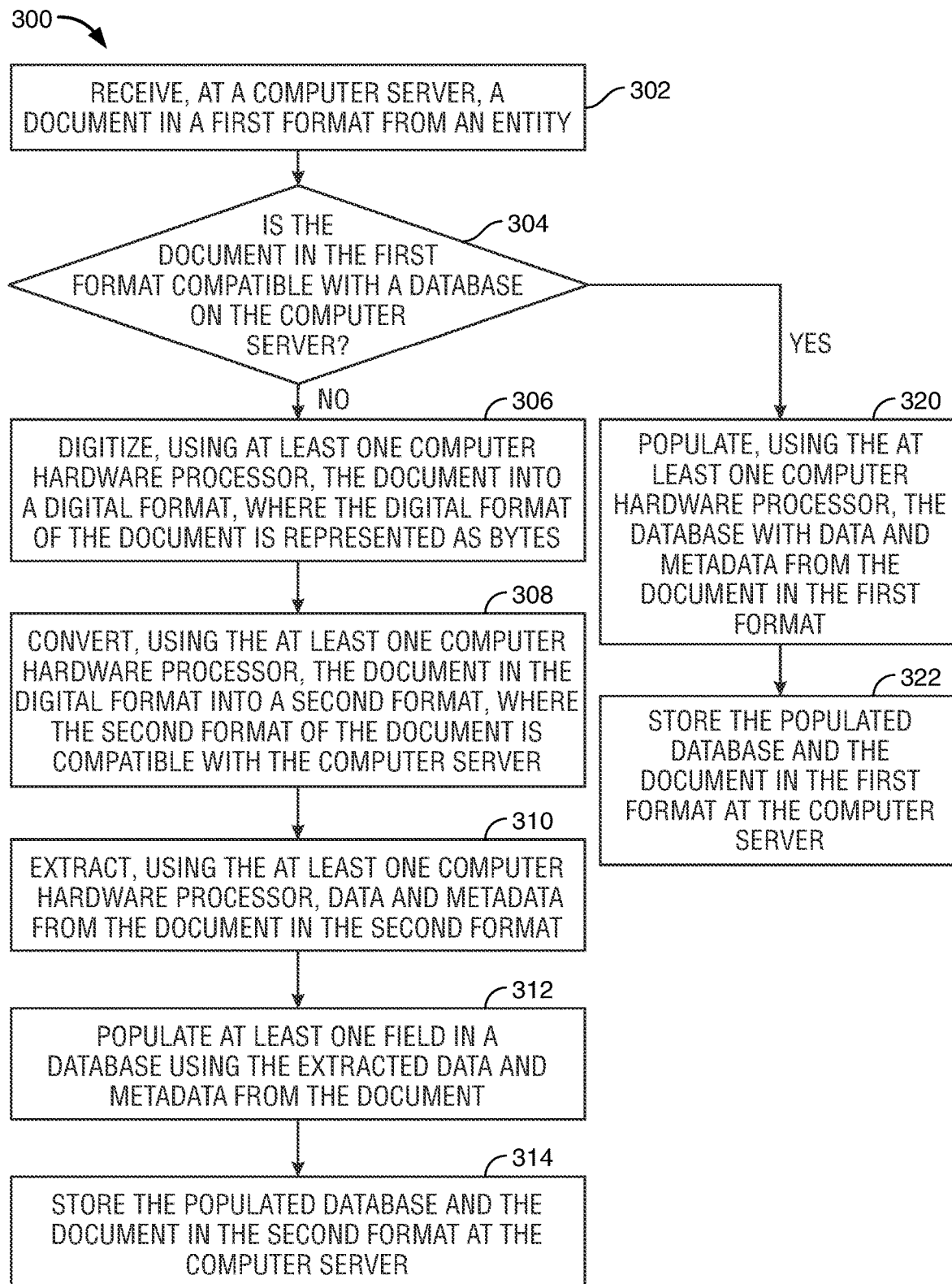
FIG. 3 is a flowchart of a process in accordance with principles of the disclosure.

FIG. 3 shows illustrative flowchart 300 of method steps for enhancing compatibility of a document of an entity with a database of an organization on a computer server.

Depicted is flowchart 300 as starting at step 302. Received at step 302 is a document in a first format from the entity, at the computer server. At step 304, it may be determined if the document in the first format is compatible with the database on the computer server.

If the document in the first format is compatible with the database, then at step 320, at least one computer hardware processor populates the database with data from the document in the first format. The at least one computer hardware processor may populate the database with metadata from the document in the first format. The at least one computer hardware processor may populate the database with data and metadata from the document in the first format. At step 322, the at least one computer hardware processor stores the populated database, and the document in the first format at the computer server.

If the document in the first format is not compatible with the database, then at step 306, at least one computer hardware processor digitizes the document into a digital format such as bytes.

At step 308, at least one computer hardware processor converts the document from the digital format into a second format, where the second format of the document may be compatible with the computer server.

At step 310, at least one computer hardware processor may extract data, metadata, or both data and metadata from the document in the second format.

At step 312, at least one computer hardware processor may populate at least one field in a database using the extracted data, metadata, or data and metadata from the document.

At step 314, the computer servers store the populated database and the document in the second format.

Figure 4:
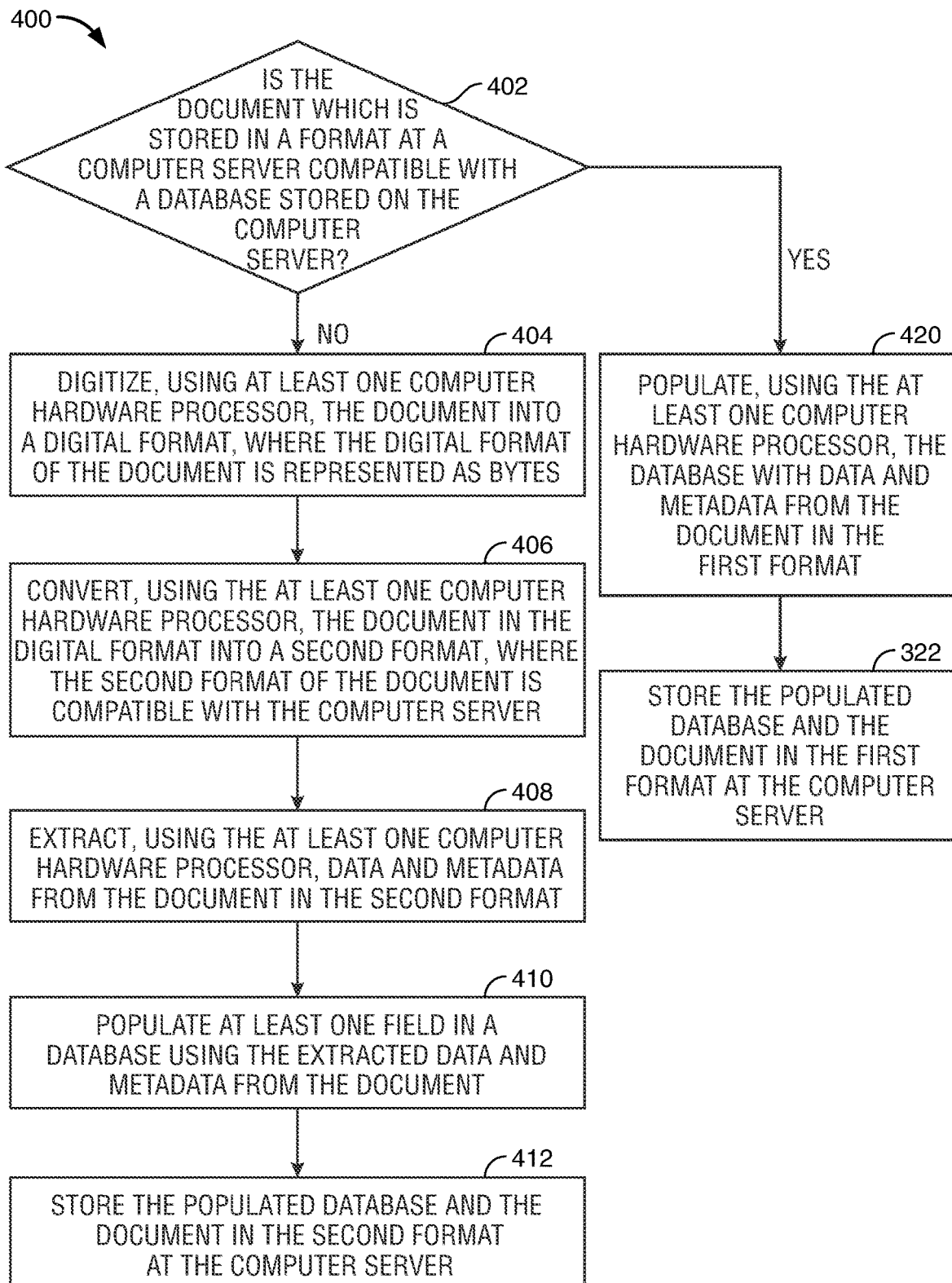
FIG. 4 is another flowchart of a process in accordance with principles of the disclosure.

FIG. 4 shows illustrative flowchart 400 of method steps for harvesting data from one or more documents stored on a computer server for populating a database of an organization. The computer servers may store the database. The one or more documents may be a legacy system. The one or more documents may not be compatible with the database. The method may enhance the compatibility of one or more documents.

Depicted is flowchart 400, starting at step 402. At step 402, at least one computer hardware processor determines the compatibility of a document stored in a first format with a database stored on a computer server.

If the document in the first format is compatible with the database, then at step 420, at least one computer hardware processor populates the database with data, metadata, or both data and metadata from the document in the first format. At step 422, the computer servers store the populated database, and the document in the first format.

If the document in the first format is not compatible with the database, then at step 404, at least one computer hardware processor digitizes the document into a digital format, such as bytes.

At step 406, at least one computer hardware processor may convert the document from the digital format into a second format, where the second format of the document may be compatible with the computer server.

At step 408, at least one computer hardware processor extracts data, metadata, or data and metadata from the document in the second format.

At step 410, at least one computer hardware processor may extract data, metadata, or data and metadata from the document and populate at least one field in a database.

At step 412, at least one computer hardware processor may populate the database and the document in the second format at the computer server.

Figure 5A:
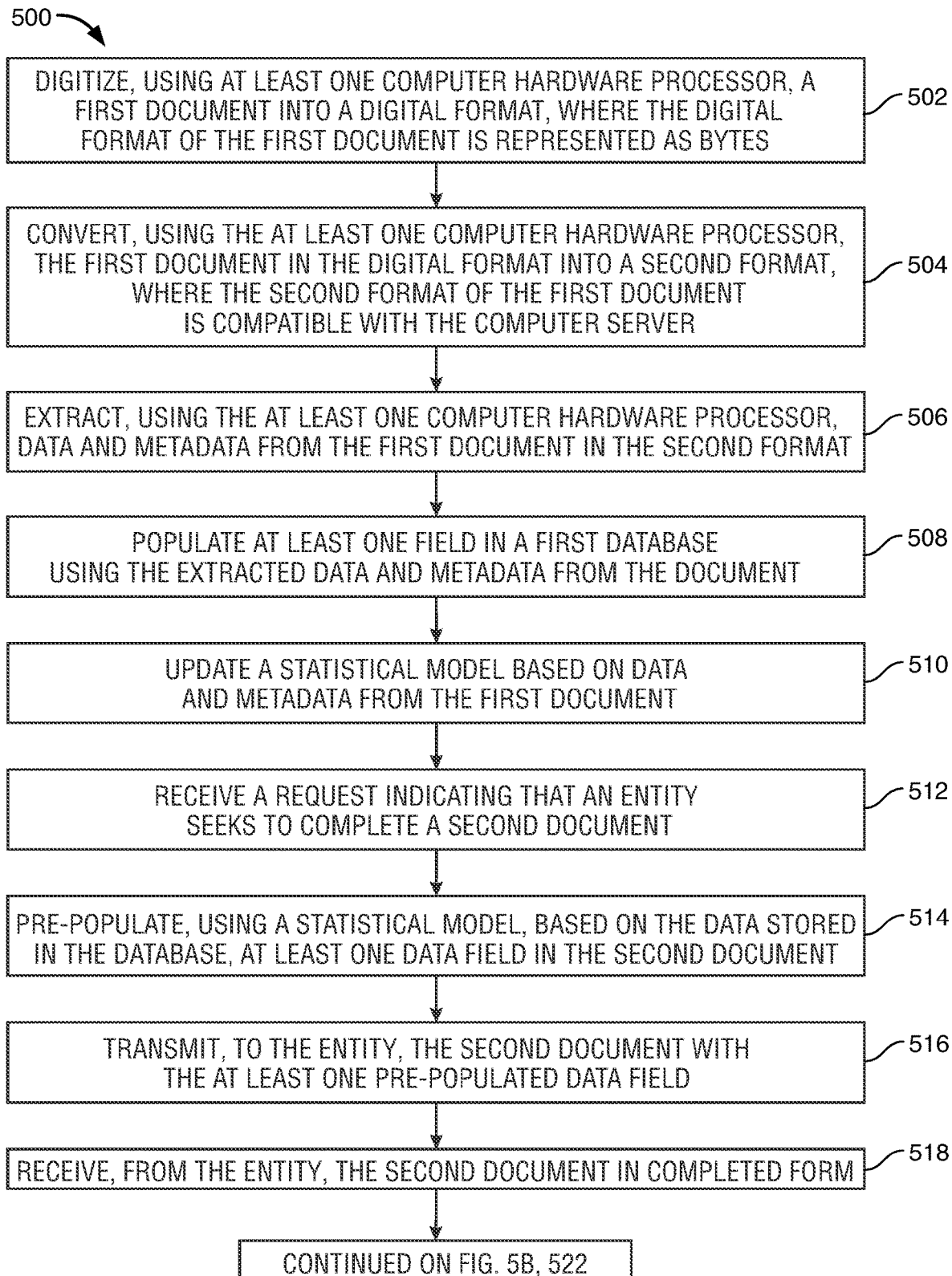
FIG. 5A is a flowchart of a process in accordance with principles of the disclosure.

FIG. 5A shows illustrative flowchart 500 of method steps for harvesting data and metadata from one or more documents stored on a computer server for populating a database of an organization. At least one computer hardware processor may update a statistical model with data, metadata, or data and metadata from the populated database. The method may include pre-populating a document requested by using the statistic model. The method may include verifying with an entity if a change is correct between the pre-populated document and a completed document received back from the entity.

Depicted is a flowchart 500, starting at step 502. At step 502, at least one computer hardware processor may digitize a document into a digital format, such as bytes.

At step 504, the at least one computer hardware processor may convert the document from the digital format into a second format, using the at least one computer hardware processor, where the second format of the document may be compatible with the computer server.

At step 506, at least one computer hardware processor may extract data, metadata, or data and metadata from the document in the second format.

At step 508, the at least one computer hardware processor may populate at least one field in a database with data, metadata, or data and metadata extracted from the document.

At step 510, at least one computer hardware processor may update a statistical model based on data, metadata, or data and metadata from the first document.

Received at step 512 is a request from an entity to complete a second document.

At step 514, the at least one computer hardware processor, using the statistical model based on the data, metadata, or data and metadata stored in the database, pre-populates at least one data field in the second document.

Transmitted, at step 516, is the second document, with at least one pre-populated data field, to the entity.

Received, at step 518, is the second document from the entity in completed form. The method continues in FIG. 5B with step 522.

Figure 5B:
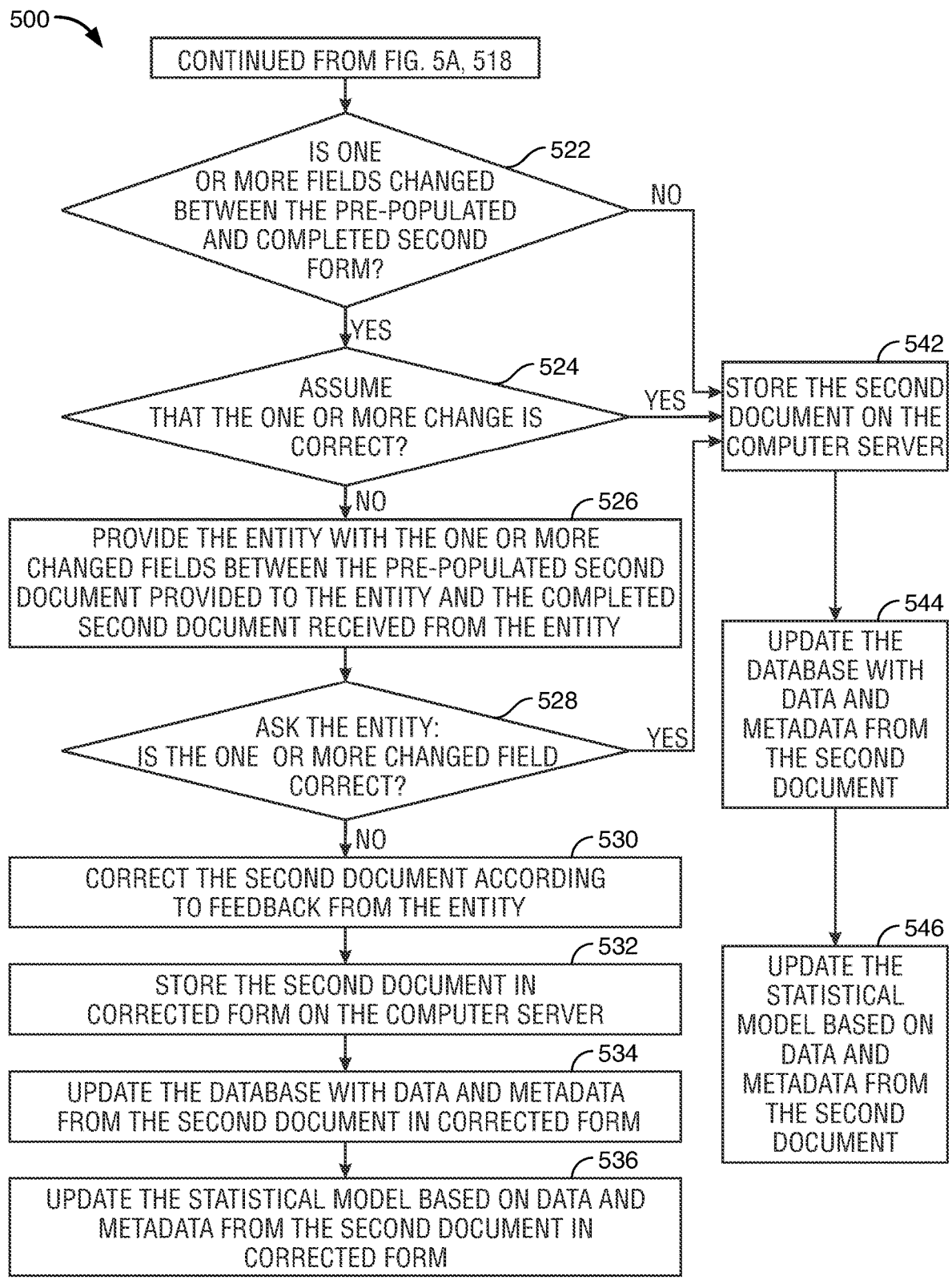
FIG. 5B is a flowchart of a process in accordance with principles of the disclosure and is a continuation of the flowchart of FIG. 5A.

FIG. 5B is a continuation of the flowchart begun in FIG. 5A. FIG. 5B shows illustrative flowchart 500 of method steps.

At step 522, it may be determined if one or more fields changed between the pre-populated and completed second form.

At step 542, with no field changed between the pre-populated and completed second form, the computer servers may: store the second document; update the database, at step 544, with data, metadata, or data and metadata from the second document; update the statistical model, at step 546, based on data, metadata, or data and metadata from the second document; and/or determine the correctness of at least one field change between the pre-populated and completed second form at step 524.

When assuming that one or more changes are correct, the servers may implement steps 542, 544 and 546, as previously described.

When not assuming that one or more changes are correct, the servers may seek verification from the entity; provide the entity, at step 526, with the one or more changed fields identified between the pre-populated second document provided to the entity and the completed second document received from the entity; provide the entity, at step 528, with an inquiry as to whether the one or more changed fields in the completed second document is correct, or if the pre-populated field in the second document provided to the entity is correct and/or follow steps 542, 544 and 546 if the entity provides feedback that the one or more changed fields are correct.

At step 530, the servers may correct the second document in accordance with the feedback from the entity, at step 532, store the corrected form of the second document on the computer server, at step 534, update the database with data, metadata, or data and metadata from the second document in corrected form and/or, at step 536, update the statistical model based on data, metadata, or data and metadata from the second document in corrected form.

Figure 6A:
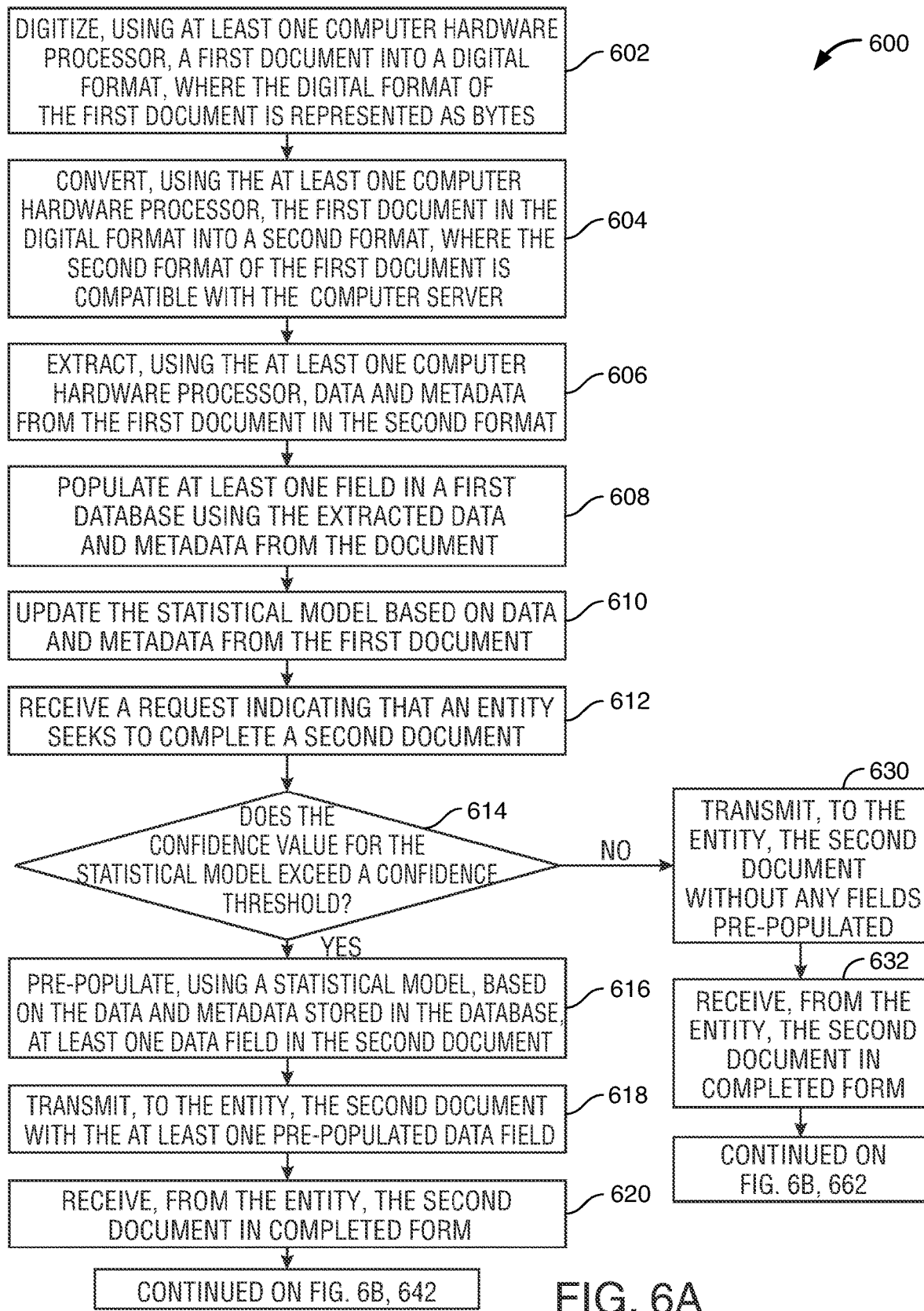
FIG. 6A is a flowchart of a process in accordance with principles of the disclosure.

FIG. 6A shows illustrative flowchart 600 for harvesting data and metadata from one or more documents stored on a computer server for populating a database of an organization. At least one computer hardware processor may update the database and a statistical model based on data and metadata from similar documents. The method may include pre-populating a document requested by using the statistic model. The method may include verifying with an entity if a change is correct between the pre-populated document and a completed document received back from the entity.

The method may further include at least one computer hardware processor to verify sufficient training of the statistical model. One may then use at least one computer hardware processor to implement the statistical model. For example, the at least one computer hardware processor may set and monitory a confidence threshold, based on a range of factors, and implement the statistic model after reaching the threshold, or may implement more training of the model before reaching the threshold.

Further, methods include at least one computer hardware processor determining a count of unsuccessful attempts to pre-populate a document. When exceeding a threshold, the method may provide for gathering more data and metadata from one or more documents completed by one or more entities. At least one computer hardware processor uses the additional data and metadata to train and update the statistical model. Once accomplishing an amount of training of the statistical model, the method may allow for utilizing the statistical method for subsequent requests to complete a document by an entity. Upon reaching a confidence threshold, such as the method described previously, or other measure of confidence, at least one computer hardware processor implements the statistical model.

Depicted is a flowchart 600, starting at step 602. At step 602, at least one computer hardware processor may digitize a document into a digital format, such as bytes.

At step 604, the at least one computer hardware processor may convert the document from the digital format into a second format, using the at least one computer hardware processor, where the second format of the document may be compatible with the computer server.

At step 606, at least one computer hardware processor may extract data, metadata, or data and metadata from the document in the second format.

At step 608, at least one computer hardware processor may populate at least one field in a database with data, metadata, or data and metadata extracted from the document.

At step 610, at least one computer hardware processor may update a statistical model based on data, metadata, or data and metadata from the first document.

Received at step 612 is a request from an entity to complete a second document.

Once accomplishing an amount of training of the statistical model, the method may allow for utilizing the statistical method for subsequent requests to complete a document by an entity.

At step 614, upon reaching a confidence threshold, such as the method described previously, or other measure of confidence, at least one computer hardware processor implements the statistical model.

At step 614, at least one computer hardware processor determines the confidence value for the statistical model. When the confidence value does not exceed a confidence threshold, then, at step 630, at least one computer hardware processor transmits the second document to the entity without any fields pre-populated.

At least one computer hardware processor receives, at step 632, the completed second document. The method continues in FIG. 6B with step 662.

When the confident value exceeds a confidence threshold, then, at step 616, the at least one computer hardware processor, using the statistical model based on the data, metadata, or data and metadata stored in the database, pre-populates at least one data field in the second document.

Transmitted, at step 618, is the second document, with at least one pre-populated data field, to the entity.

Received, at step 620, is the second document from the entity in completed form. The method continues in FIG. 6B with step 642.

Figure 6B:
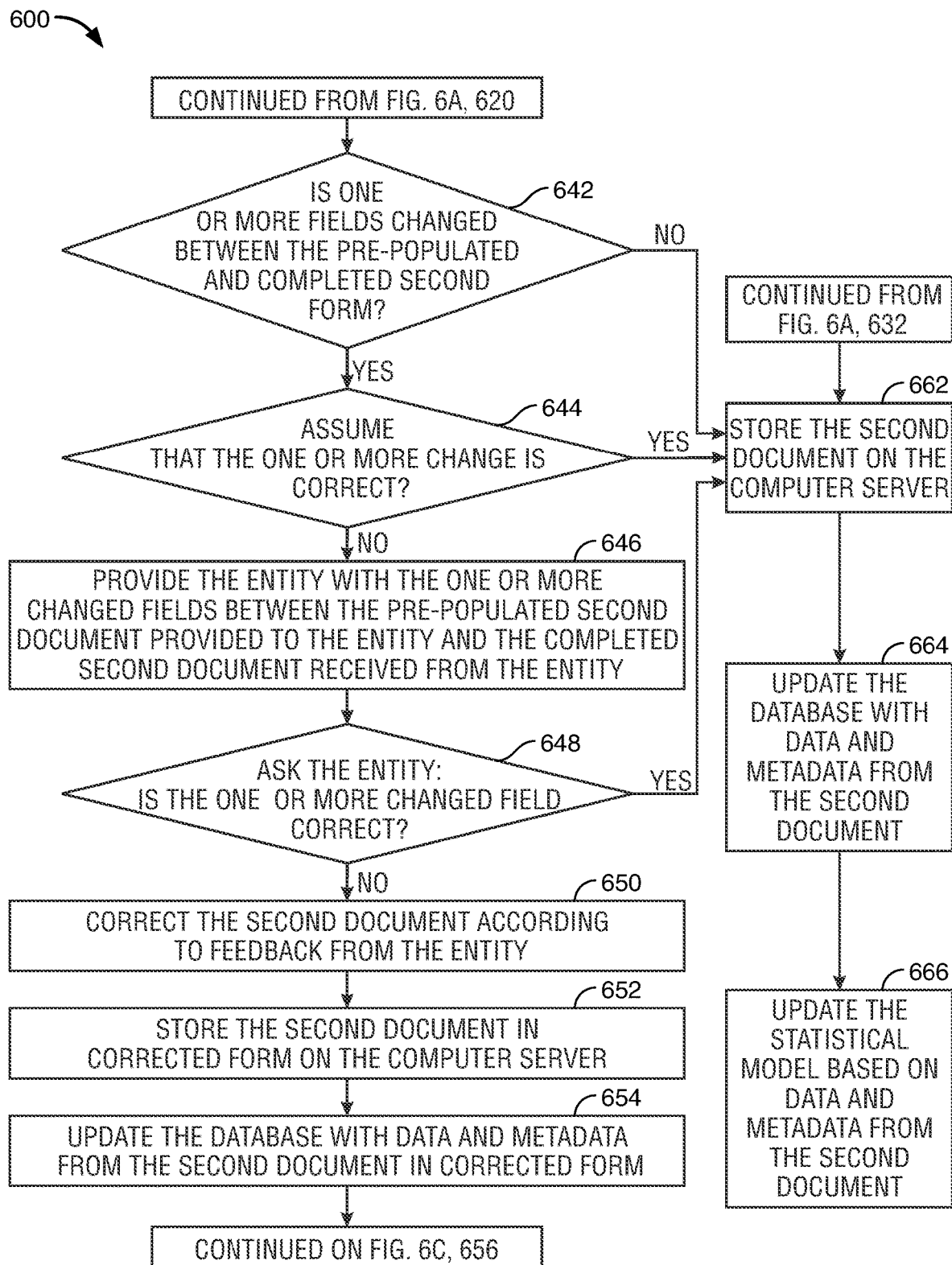
FIG. 6B is a flowchart of a process in accordance with principles of the disclosure and is a continuation of the flowchart of FIG. 6A.

FIG. 6B is a continuation of the method begun in FIG. 6A. FIG. 6B shows illustrative flowchart 600 of method steps.

Continuing from step 632 in FIG. 6A, the method continues in FIG. 6B with step 662. At step 662, at least one computer hardware processor stores the second document on the computer server.

At step 664, at least one computer hardware processor updates the database with data, metadata, or data and metadata from the second document.

At step 666, at least one computer hardware processor updates the statistical model based on data, metadata, or data and metadata from the second document.

Continuing from step 620 in FIG. 6A, the method continues in FIG. 6B with step 642. At step 642, at least one computer hardware processor determines differences in the data fields between the pre-populated and completed second document.

At step 662, at least one computer hardware processor stores the second document on the computer server when the fields are similar between the pre-populated and completed second form. At step 664, at least one computer hardware processor updates the database with data, metadata, or data and metadata from the second document. At step 666, at least one computer hardware processor updates the statistical model based on data, metadata, or data and metadata from the second document.

When there is at least one change, one may determine the correctness of at least one field changed between the pre-populated and completed second form at step 644.

When assuming that one or more changes are correct, implement steps 662, 664, and 666, as previously described.

When assuming that one or more changes are correct, seek verification from the entity. Provide the entity, at step 646, with the one or more changed fields identified between the pre-populated second document provided to the entity and the completed second document received from the entity.

Provide the entity, at step 648, with an inquiry as to whether the one or more changed fields in the completed second document is correct, or if the pre-populated field in the second document provided to the entity is correct.

Follow steps 662, 664 and 666 if the entity provides feedback that the one or more changed fields are correct.

At step 650, correct the second document in accordance with the feedback from the entity.

At step 652, store the corrected form of the second document on the computer server.

At step 654, update the database with data, metadata, or data and metadata from the second document in corrected form. The method may continue in FIG. 6C with step 656.

Figure 6C:
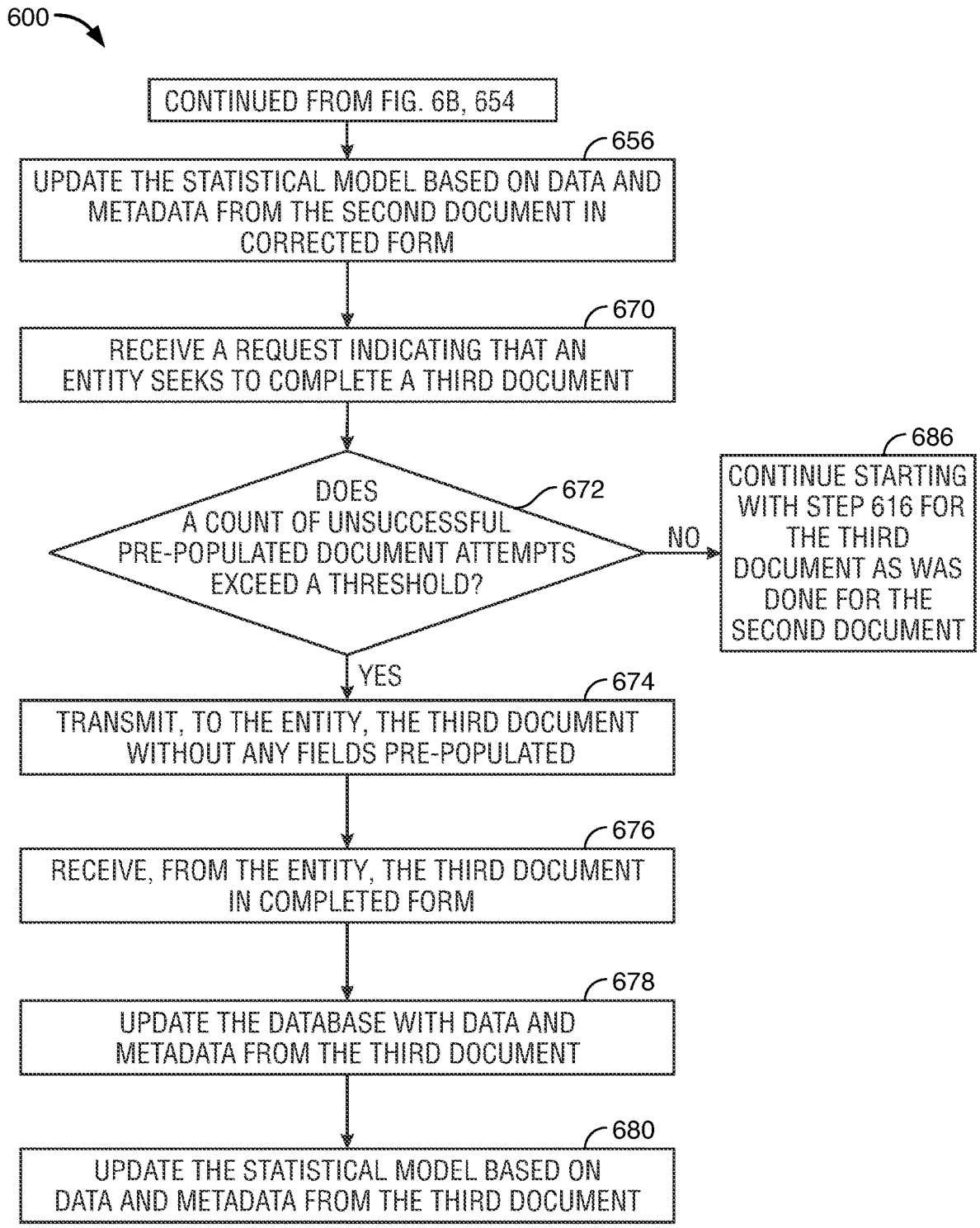
FIG. 6C is a flowchart of a process in accordance with principles of the disclosure and is a continuation of the flowchart of FIG. 6B.

FIG. 6C is a continuation of the method begun in FIG. 6B. FIG. 6C shows illustrative flowchart 600 of method steps.

At step 656, update the statistical model based on data, metadata, or data and metadata from the second document in corrected form Received, at step 670, is a request indicating that an entity seeks to complete a third document. Determined, at step 672, is a count of unsuccessful pre-populated document attempts.

If the count of unsuccessful pre-populated documents does not exceed a threshold, then, at step 686, the method may continue with step 616, except implementing the method for a third document instead of a second document.

If the count of unsuccessful pre-populated documents does exceed a threshold, then, at step 674, at least one computer hardware processor transmits the third document to the entity without any fields pre-populated.

Received from the entity, at step 676, is the third document in completed form.

At step 678, at least one computer hardware processor may update the database with data, metadata, or data and metadata from the third document.

At step 680, at least one computer hardware processor may update the statistical model based on data from the third document.

Figure 7:
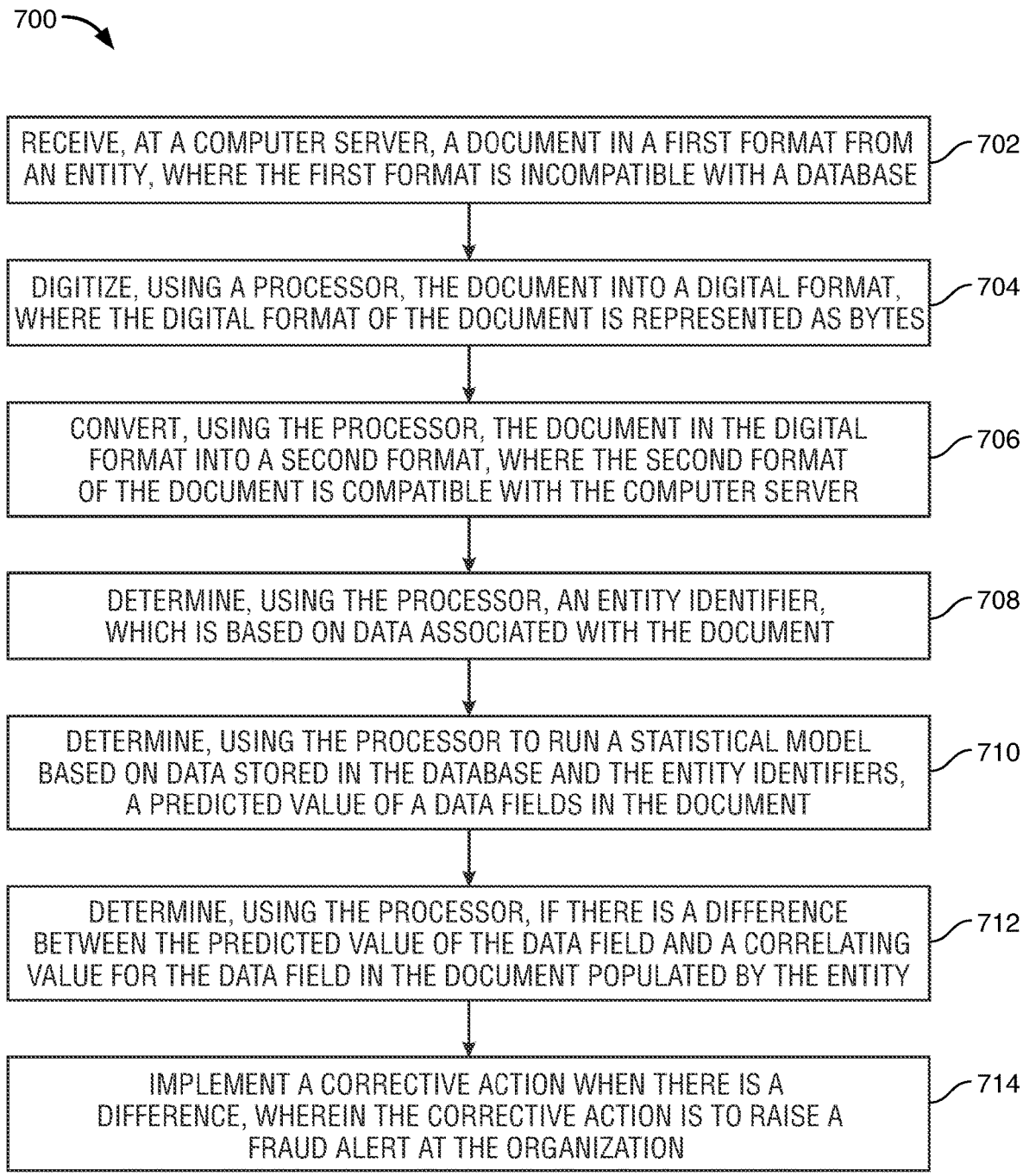
FIG. 7 is another flowchart of a process in accordance with principles of the disclosure.

FIG. 7 shows illustrative flowchart 700 of method steps for enhancing compatibility of a document of an entity with a database of an organization to facilitate detection of a fraudulent submission, where storage of the database is on a computer server.

Depicted is flowchart 700 as starting at step 702. Receive at step 702 at the computer server a document in a first format from the entity. The first format can be compatible with the database. At step 704, a processor can digitize the document into a digital format such as bytes.

At step 706, the processor can convert the document from the digital format into a second format, where the second format of the document can be compatible with the computer server. At step 708, the processor can determine an entity identifier based on data associated with the document. At step 710, the processor can run a statistical model based on data stored in the database and use the entity identifier to predict a value of a data field in the document.

At step 712, the processor can determine if there is a difference between a predicted value of the data field and a correlating value for the data field in the document populated by the entity. At step 714, the processor can implement a corrective action when there is a difference, wherein the corrective action is to raise a fraud alert at the organization.

Figure 8:
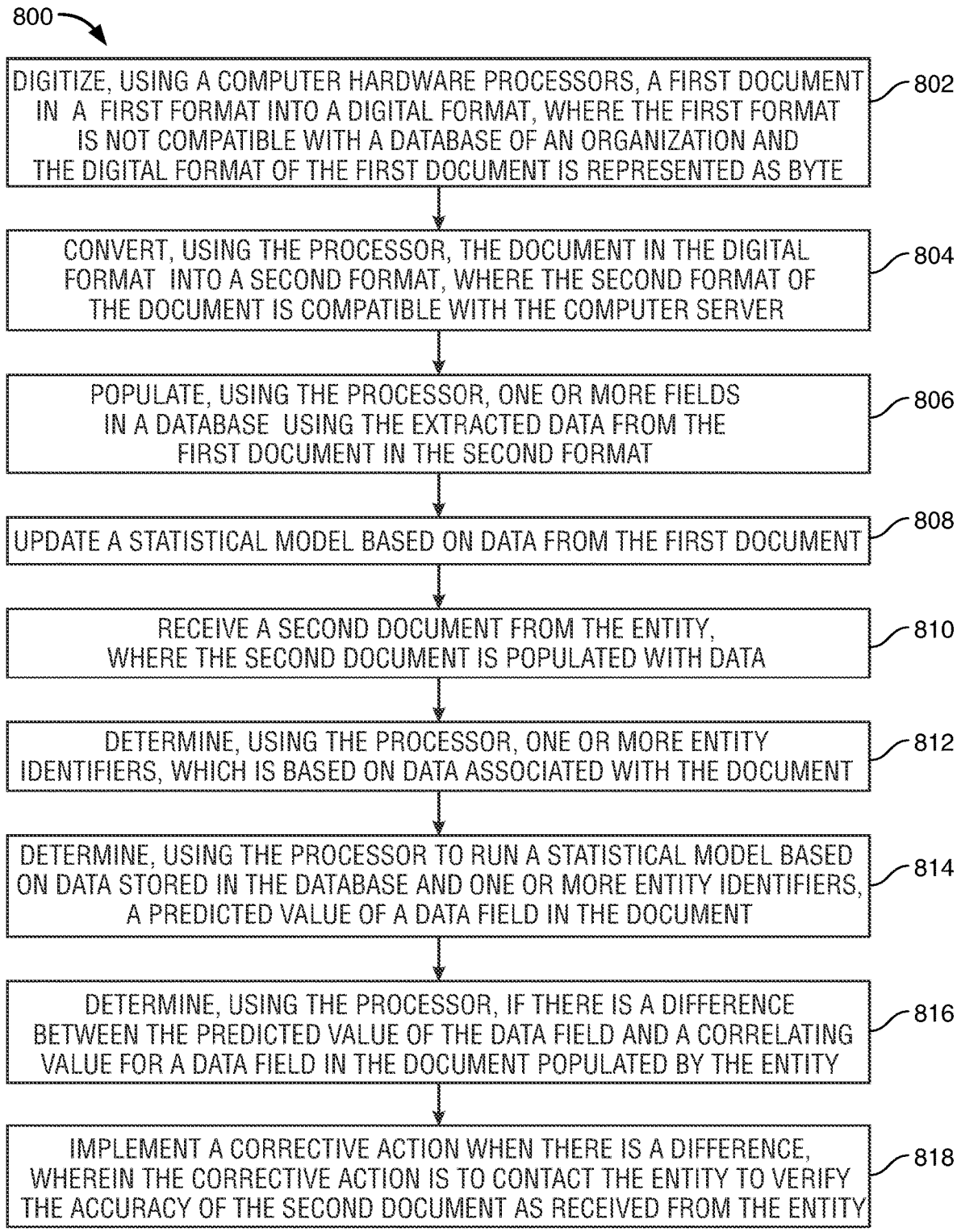
FIG. 8 is another flowchart of a process in accordance with principles of the disclosure.

FIG. 8 shows illustrative flowchart 800 of method steps for enhancing compatibility of a document with a database of an organization to facilitate use of a statistical model, where the computer server can store a database and the database can provide content to enable the statistical model. A processor may use the statistical model to detect a fraudulent submission.

Depicted is flowchart 800 as starting at step 802. At step 802, a processor can digitize a first document in a first format into a digital format, where the first format is not compatible with a database of an organization or is poorly compatible with a database of an organization, and the digital format of the first document can be as bytes. At step 804, the processor can convert the document from the digital format into a second format, where the second format of the document can be compatible with the computer server.

At step 806, the processor can populate a date field in a database using extracted data from the first document in the second format. At step 808, update a statistical model based on data from the first document. At step 810, receive a second document from the entity populated with data. At step 812, determine, using the processor, an entity identifier, which can be based on data associated with the second document.

At step 814, the processor can run a statistical model based on data stored in the database and the identifier to predict a value of a data field in the second document. At step 816, the processor can determine if there is a difference between the predicted value of the data field and a correlating value for the data field in the second document populated by the entity. At step 818, the processor can implement a corrective action when there is a difference, wherein the corrective action is to contact the entity to verify the accuracy of the second document as received from the entity. The mention of data, herein, may refer to data, metadata, or both data and metadata.

Presented herein are systems and methods for enhancing compatibility of a document to facilitate addition of data from the document to a database and use of the database to power a statistical model to identify fraudulent behavior. Persons skilled in the art may practice the present invention in other than the described embodiments. Presented are embodiments for purposes of illustration rather than of limitation. Only the claims that follow limit the present invention.

What is claimed is:

1. A method for extending a usable lifetime of a legacy database of an organization by converting documents stored on the legacy database from a format that is incompatible with a computer hardware processor in electronic communication with the legacy database into a format compatible with the computer hardware processor and using the converted documents to train a machine learning artificial intelligence (AI) system to auto-populate a newly requested document, the method comprising:

digitizing, using optical character recognition (OCR) run on the computer hardware processor, documents in a first format into a digital format;
wherein:
the first format is incompatible with the computer hardware processor; and
the documents are stored on the legacy database;
converting, using the computer hardware processor, the documents in the digital format into a second format;
wherein the second format is compatible with the computer hardware processor;
storing, using the computer hardware processor, the documents in the second format on the legacy database;
training, using a graphics processing unit (GPU) in electronic communication with the computer hardware processor, a machine learning AI system, using the documents stored in the second format in the legacy database;
wherein the machine learning AI system auto-populates new documents in the second format;
receiving a request, at the computer hardware processor, from an entity for a first document in the second format;
determining a confidence level, using the GPU, for completing the first document in the second format;
when the confidence level is above a pre-determined threshold, using the GPU to run the machine learning AI system to auto-populate the first document in the second format;
providing, using the computer hardware processor, the auto-populated first document in the second format to the entity for feedback;
receiving from the entity, at the computer hardware processor, the first document in corrected form indicating that there was a mistake in the auto-population of the first document;
storing, using the computer hardware processor, the first document in corrected form on the legacy database;
when the confidence level falls below the pre-determined threshold due to the mistake in the auto-population of the first document, updating the training of the machine learning AI system, using the GPU, to learn from the mistake;
receiving a request, at the computer hardware processor, from an entity for a second document in the second format;
determining, using the GPU, a confidence level for completing the second document;
when the confidence level for completing the second document is above the pre-determined threshold, using the GPU to run the machine learning AI system to auto-populate the second document;
providing, using the computer hardware processor, the auto-populated second document to the entity for feedback;
receiving, at the computer hardware processor, feedback from the entity that the second document is auto-populated correctly;
storing, using the computer hardware processor, the second document on the legacy database; and updating, using the GPU, the machine learning AI system using the feedback that the second document is auto-populated correctly.

2. A method for extending a usable lifetime of a legacy database of an organization by converting documents stored on the legacy database from a format that is incompatible with a computer hardware processor in electronic communication with the legacy database into a format compatible with the computer hardware processor and using the converted documents to train a machine learning artificial intelligence (AI) system to detect errors in an incoming document, the method comprising:

digitizing, using optical character recognition (OCR) run on the computer hardware processor, documents in a first format into a digital format;
wherein:
the first format is incompatible with the computer hardware processor; and
the documents are stored on the legacy database;
converting, using the computer hardware processor, the documents in the digital format into a second format;
wherein the second format is compatible with the computer hardware processor;
storing, using the computer hardware processor, the documents in the second format on the legacy database;
training, using a graphics processing unit (GPU) in electronic communication with the computer hardware processor, a machine learning AI system, using the documents stored in the second format in the legacy database;
wherein the machine learning AI system detects errors in incoming populated documents in the second format;
receiving a populated first document, at the computer hardware processor, from an entity in a format which is incompatible with the computer hardware processor;
digitizing, using OCR run on the computer hardware processor, the populated first document into a digital format;
converting, using the computer hardware processor, the populated first document in the digital format into the second format;
determining a confidence level, using the GPU, for the machine learning AI system to evaluate populated entries in the populated first document for errors;
when the confidence level is above a pre-determined threshold, using the GPU to run the machine learning AI system to detect an error in the populated first document;
providing, using the computer hardware processor, a detected error in the populated first document to the entity for feedback;
receiving from the entity, at the computer hardware processor, feedback that the error detected by the machine learning AI system is a mistake;
storing, using the computer hardware processor, the populated first document without changing the error on the legacy database;
when the confidence level falls below the pre-determined threshold due to the mistake in the error detection for the populated first document, updating the training of the machine learning AI system, using the GPU, to learn from the mistake;
receiving a populated second document, at the computer hardware processor, from an entity in a format which is incompatible with the computer hardware processor;

digitizing, using OCR run on the computer hardware processor, the populated second document into a digital format;
converting, using the computer hardware processor, the populated second document in the digital format into the second format;
determining a confidence level, using the GPU, for the machine learning AI system to evaluate populated entries in the populated second document for errors;
when the confidence level for identifying an error in the populated second document is above the pre-determined threshold, using the GPU to run the machine learning AI system to detect an error in the populated second document;
providing, using the computer hardware processor, a detected error in the populated second document to the entity for feedback;
receiving from the entity, at the computer hardware processor, that the populated second document should be changed reflecting the detected error;
storing, using the computer hardware processor, the populated second document with the error changed on the legacy database; and
updating, using the GPU, the machine learning AI system.

3. A system for extending a usable lifetime of a legacy database of an organization by converting documents stored on the legacy database from a format that is incompatible with a computer hardware processor in electronic communication with the legacy database into a format compatible with the computer hardware processor and using the converted documents to train a machine learning artificial intelligence (AI) system to auto-populate a newly requested document, the system comprising:

a computer hardware processor; and
a non-transitory computer-readable storage medium storing processor-executable instructions that, when executed by the computer hardware processor, cause the computer hardware processor to perform:
digitizing, using optical character recognition (OCR) run on the computer hardware processor, documents in a first format into a digital format;
wherein:
the first format is incompatible with the computer hardware processor; and
the documents are stored on the legacy database;
converting, using the computer hardware processor, the documents in the digital format into a second format;
wherein the second format is compatible with the computer hardware processor;
storing, using the computer hardware processor, the documents in the second format on the legacy database;
training, using a graphics processing unit (GPU) in electronic communication with the computer hardware processor, a machine learning AI system, using the documents stored in the second format in the legacy database;
wherein the machine learning AI system auto-populates new documents in the second format;
receiving a request, at the computer hardware processor, from an entity for a first document in the second format;
determining a confidence level, using the GPU, for completing the first document in the second format;

when the confidence level is above a pre-determined threshold, using the GPU to run the machine learning AI system to auto-populate the first document in the second format;

providing, using the computer hardware processor, the auto-populated first document in the second format to the entity for feedback;

receiving from the entity, at the computer hardware processor, the first document in corrected form indicating that there was a mistake in the auto-population of the first document;

storing, using the computer hardware processor, the first document in corrected form on the legacy database;

when the confidence level falls below the pre-determined threshold due to the mistake in the auto-population of the first document, updating the training of the machine learning AI system, using the GPU, to learn from the mistake;

receiving a request, at the computer hardware processor, from an entity for a second document in the second format;

determining, using the GPU, a confidence level for completing the second document;

when the confidence level for completing the second document is above the pre-determined threshold, using the GPU to run the machine learning AI system to auto-populate the second document;

providing, using the computer hardware processor, the auto-populated second document to the entity for feedback;

receiving, at the computer hardware processor, feedback from the entity that the second document is auto-populated correctly;

storing, using the computer hardware processor, the second document on the legacy database; and updating, using the GPU, the machine learning AI system using the feedback that the second document is auto-populated correctly.

* * * * *